United States Patent
Gabehart et al.

[19]

[11] Patent Number: 6,130,518

[45] Date of Patent: Oct. 10, 2000

[54] METHOD AND APPARATUS FOR CHARGING A BATTERY

[75] Inventors: William A. Gabehart, Fort Worth; Mario A. Riveron, Keller, both of Tex.

[73] Assignee: Motorola, Inc., Schaumburg, Ill.

[21] Appl. No.: 09/470,552

[22] Filed: Dec. 22, 1999

[51] Int. Cl.[7] .................................................. H02J 7/00
[52] U.S. Cl. .......................................... 320/103; 320/114
[58] Field of Search ..................................... 320/103, 114

[56] References Cited

U.S. PATENT DOCUMENTS

| | | | |
|---|---|---|---|
| 4,673,861 | 6/1987 | Dubovsky et al. | 455/575 |
| 5,675,813 | 10/1997 | Holmdahl | 713/310 |
| 5,926,006 | 9/1999 | Burroughs et al. | 320/114 |
| 6,044,280 | 3/2000 | Muller | 455/572 |

*Primary Examiner*—Peter S. Wong
*Assistant Examiner*—Pia Tibbits
*Attorney, Agent, or Firm*—R. Louis Breeden

[57] ABSTRACT

A portable communication device (300) powered by a battery (210) has an external connector (202) that includes an external power node (220) and a data bus (204) having an integral power node (218). A processing system (228) of the device senses (402) whether power is available at the external power node, and controls a charging switcher (216) to charge (406) the battery from the external power node whenever power is available at the external power node. The processing system enables (412) battery charging from the integral power node when power is not available at the external power node.

15 Claims, 3 Drawing Sheets

METHOD AND APPARATUS FOR CHARGING A BATTERY

FIELD OF THE INVENTION

This invention relates in general to battery chargers, and more specifically to a method and apparatus for selectively charging a battery in a portable communication device from an integral power node of a data bus.

BACKGROUND OF THE INVENTION

Battery chargers are well known. Such devices generally receive power from a standard AC electrical outlet and convert the power into a proper DC voltage for recharging a battery. There can be times, however, when it is inconvenient or impossible to use a prior-art battery charger to recharge a battery in a portable communication device. For example, when one is travelling, there may be no suitable power outlet for powering the prior-art battery charger, or one may not have brought the battery charger along on the trip.

Thus, what is needed is an alternative method and apparatus for recharging a battery. Preferably, the alternative method and apparatus will not require an AC power outlet or a battery charger, but will utilize power from another device to which the portable communication device can be coupled.

SUMMARY OF THE INVENTION

An aspect of the present invention is a method for charging a battery in a portable communication device having an external connector that includes an external power node and a data bus having an integral power node. The method comprises the steps of sensing whether power is available at the external power node, and charging the battery from the external power node whenever power is available at the external power node. The method further comprises the step of enabling battery charging from the integral power node when power is not available at the external power node.

Another aspect of the present invention is an apparatus for charging a battery in a portable communication device having an external connector that includes an external power node and a data bus having an integral power node. The apparatus comprises a sensor for sensing whether power is available at the external power node, and charging circuitry coupled to the sensor for charging the battery from the external power node whenever power is available at the external power node. The apparatus further comprises enabling circuitry coupled to the sensor for enabling battery charging from the integral power node when power is not available at the external power node.

Another aspect of the present invention is a portable communication device. The portable communication device comprises a receiver for receiving a message, and a processing system coupled to the receiver for processing the message. The portable communication device further comprises an external connector including an external power node and a data bus having an integral power node. The portable communication device also includes an apparatus for charging a battery. The apparatus comprises a sensor for sensing whether power is available at the external power node, and charging circuitry coupled to the sensor for charging the battery from the external power node whenever power is available at the external power node. The apparatus further comprises enabling circuitry coupled to the sensor for enabling battery charging from the integral power node when power is not available at the external power node.

DETAILED DESCRIPTION OF THE DRAWINGS

Figure 1:
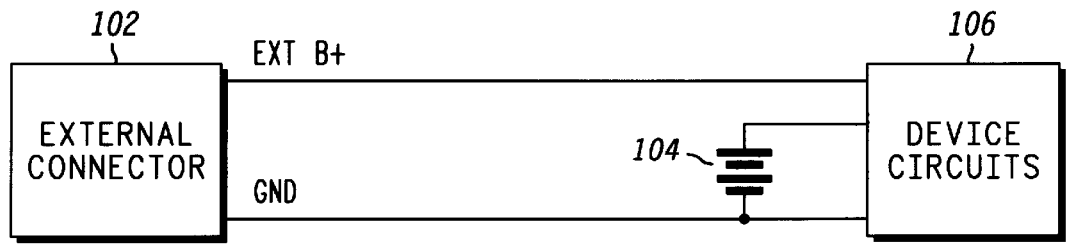
FIG. 1 is an electrical block diagram of a prior-art battery charging apparatus.

FIG. 1 is an electrical block diagram of a prior-art battery charging apparatus, comprising an external connector 102 for providing an external B+ charging power and ground supplied from a external charging element. In the prior-art battery charging apparatus, the external B+ charging power and ground are coupled to a battery 104 through the device circuits 106 The device circuits 106 can include communication circuits powered from the battery 104 and circuits for regulating the charging voltage and/or current.

Figure 2:
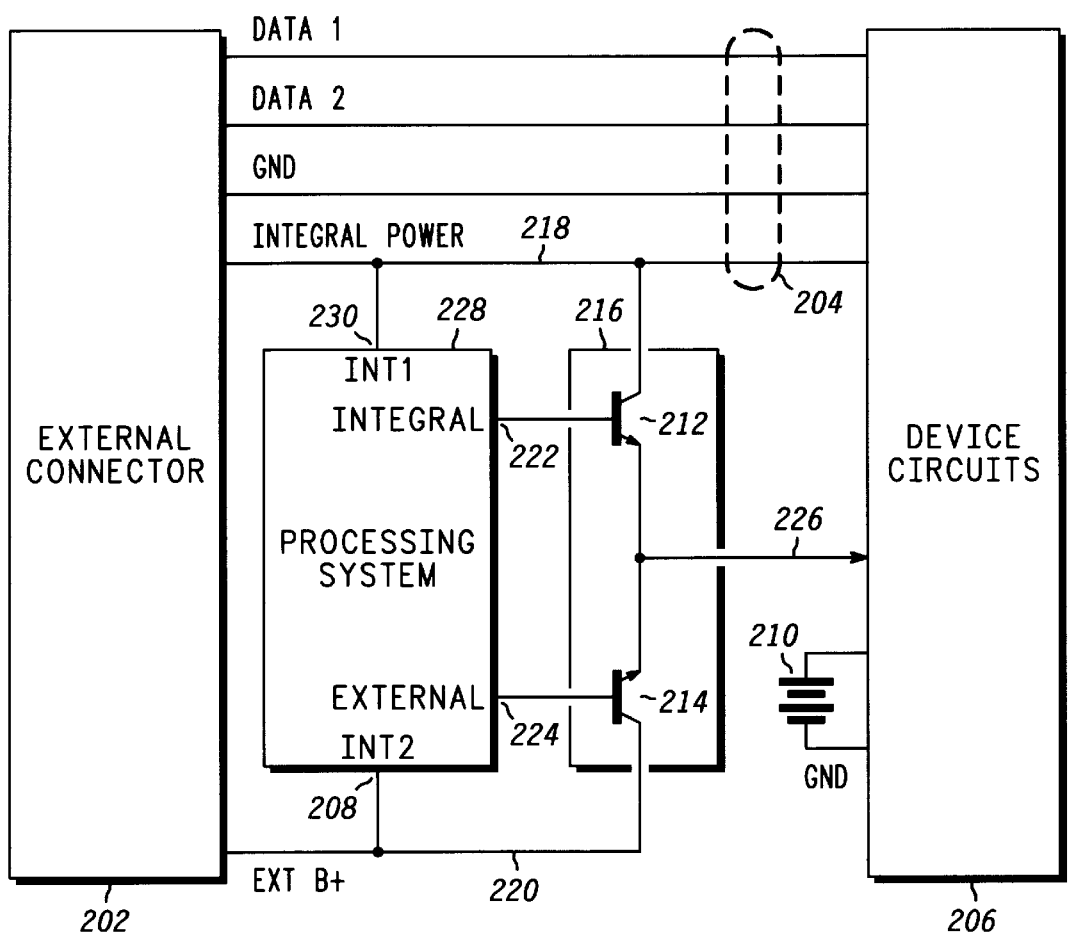
FIG. 2 is a simplified electrical block diagram of a first embodiment of a battery charging apparatus in accordance with the present invention.

FIG. 2 is a simplified electrical block diagram of a first embodiment 200 of a battery charging apparatus in accordance with the present invention, comprising an external connector 202 that includes an external power node 220 and a data bus 204 having an integral power node 218. The data bus 204 preferably meets the well-known Universal Serial Bus (USB) standards as defined in the Universal Serial Bus Specification Revision 1.1. The data bus 204 preferably includes differential data input/output (I/O) lines DATA 1 and DATA 2 and a ground reference GND, as well as the integral power node 218, all of which are preferably coupled to the device circuits 206. The Universal Serial Bus is commonly found on modern computers, including portable laptop computers, and other communication devices that have a need to exchange data with one another. It will be appreciated that, alternatively, other types of busses can be substituted for the USB.

Both the integral power node 218 and the external power node 220 preferably are coupled to a charging switcher 216, which is coupled to a processing system 228. The integral power node is coupled to a first interrupt port 230 of the processing system 228, so that the processing system 228 can sense, through well-known techniques, whether power is available at the integral power node. The external power node 220 is coupled to a second interrupt port 208 of the processing system 228 so that the processing system 228 can sense, through well-known techniques, whether power is available at the external power node 220. A first I/O port 224 of the processing system 228 is controlled by the processing system 228 to maintain a HIGH state, e.g., 5 volts, whenever power is available at the external power node 220, and a LOW state, e.g., near zero volts, whenever power is not available at the external power node 220. A second I/O port 222 of the processing system 228 is controlled by the processing system 228 to maintain a HIGH state whenever power is not available at the external power node 220, and a LOW state whenever power is available at the external power node 220. It will be appreciated that, alternatively, the processing system 228 can evaluate additional information, e.g., a user-programmed instruction, before changing the second I/O port 222 to a HIGH state.

A first transistor 214 is coupled between the external power node 220 and a charging node 226 preferably coupled to the device circuits 206 for powering the device circuits 206. The device circuits 206 preferably are coupled to a battery 210 for charging the battery 210 and for receiving power therefrom. The first transistor 214 is controlled by the first I/O port 224 to power the device circuits 206 and to charge the battery 210 from the external power node 220 whenever power is available at the external power node 220. A second transistor 212 is coupled between the integral power node 218 and the charging node 226. The second transistor 212 is controlled by the second I/O port 222 to enable battery charging and device circuits powering from the integral power node 218 when power is not available at the external power node 220, and to disable battery charging and device circuits powering from the integral power node 218 when power is available at the external power node 220. This arrangement advantageously allows the battery 210 to be charged from the power available on the data bus 204 when the primary battery charging means, i.e., a mains-powered charging element for providing power to the external power node 220, is unavailable.

Figure 3:
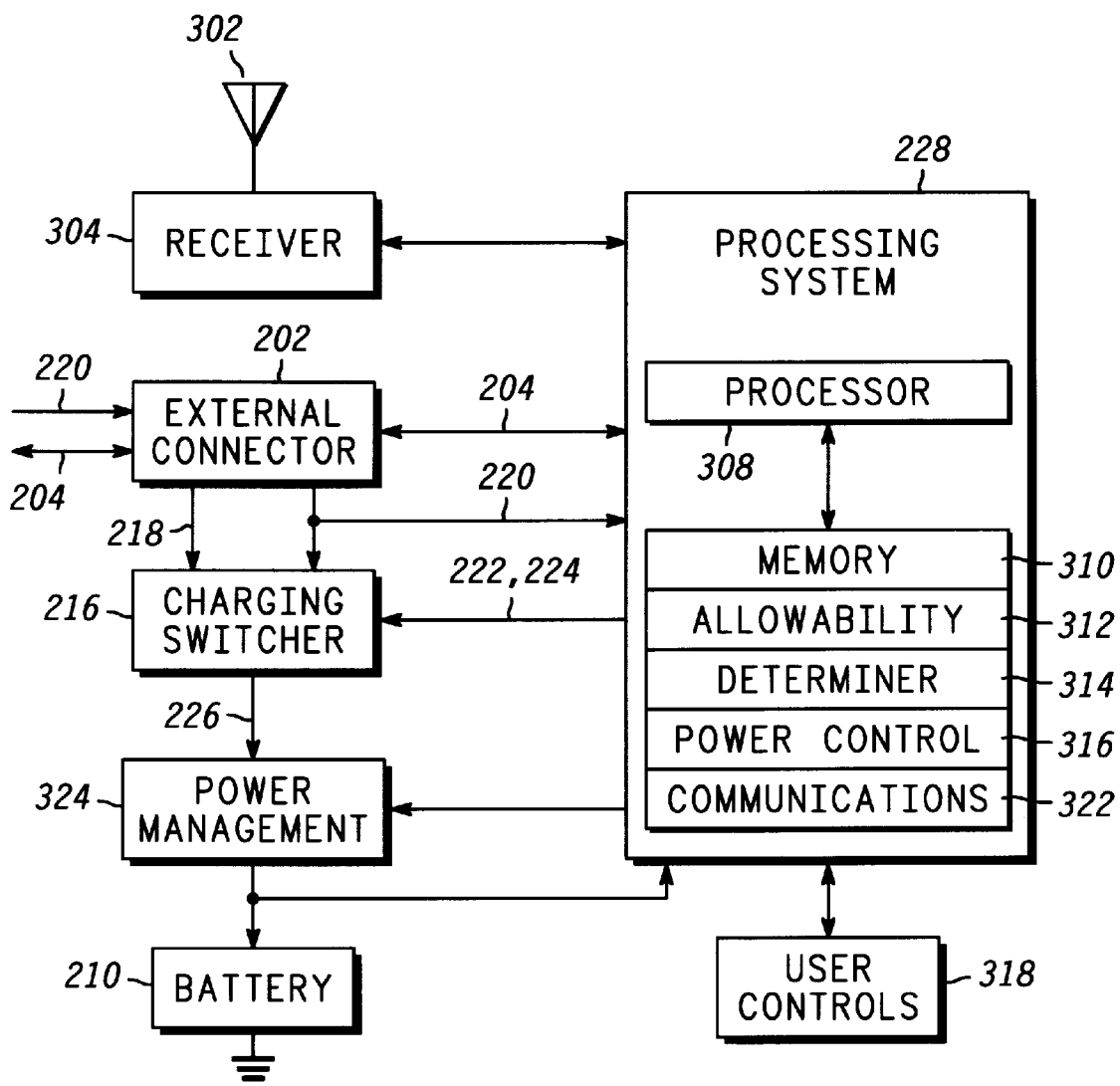
FIG. 3 is an electrical block diagram of a portable communication device comprising a second embodiment of the battery charging apparatus in accordance with the present invention.

FIG. 3 is an electrical block diagram of a portable communication device 300 comprising a second embodiment of the battery charging apparatus in accordance with the present invention. The device 300 comprises a conventional receiver 304 for receiving a message. The receiver 304 is coupled to an antenna 302 for intercepting a wireless signal carrying the message. The receiver 304 is further coupled to the processing system 228 for processing the message and for controlling the operation of the charging switcher 216. The device 300 further comprises the external connector 202, including the external power node 220 and the data bus 204, both of which are coupled to the processing system 228. In addition, the external power node 220 and the integral power node 218 are coupled to the charging switcher 216. The charging node 226 is preferably coupled to a power management circuit 324 for regulating the voltage and current delivered from the charging switcher 216. When the power is supplied from the external power node 220, the power management circuit 324 is controlled by the processing system 228 to limit the current to a first predetermined value, e.g., 500 milliamps. When the power is supplied from the integral power node 218, the power management circuit 324 is controlled by the processing system 228 to limit the current to a second predetermined value, e.g., 100 milliamps. This advantageously allows the maximum current demanded from the external power node 220 and the maximum current demanded from the integral power node 218 to differ in accordance with the capabilities of each node.

As described above, the charging switcher 216 advantageously allows the battery 210 to be charged from the external power node 220 whenever power is available at the external power node 220, and from the integral power node 218 when power is not available at the external power node 220. The device 300 also includes conventional user controls 318 coupled to the processing system 228 for providing user control of the device 300. The user controls 318 can be utilized, for example, by a user to generate a command to allow or disallow battery charging from the integral power node 218. The user may want to disallow battery charging from the integral power node 218, for example, when the power of the integral power node 218 is supplied from another battery powered device whose battery is nearly depleted.

The processing system 228 comprises a conventional processor 308 and conventional memory 310. The memory 310 comprises software and variables used in accordance with the present invention. The memory 310 includes a space for storing an allowability variable 312, which indicates whether the user has generated a command to allow or disallow battery charging from the integral power node of the data bus 204. The memory 310 also includes a determiner program 314 for checking the allowability variable 312 to determine whether battery charging from the integral power node is allowed before charging the battery from the integral power node. The memory 310 further comprises a power control program 316 for controlling the states of the first and second I/O ports 222, 224 in accordance with the present invention. The memory 310 also includes a conventional communications program 322 for controlling the communications of the device 300. While the device 300 is depicted as a wireless communication device, it will be appreciated that the present invention is applicable to non-wireless portable communication devices as well, such as electronic organizers or personal digital assistants.

Figure 4:
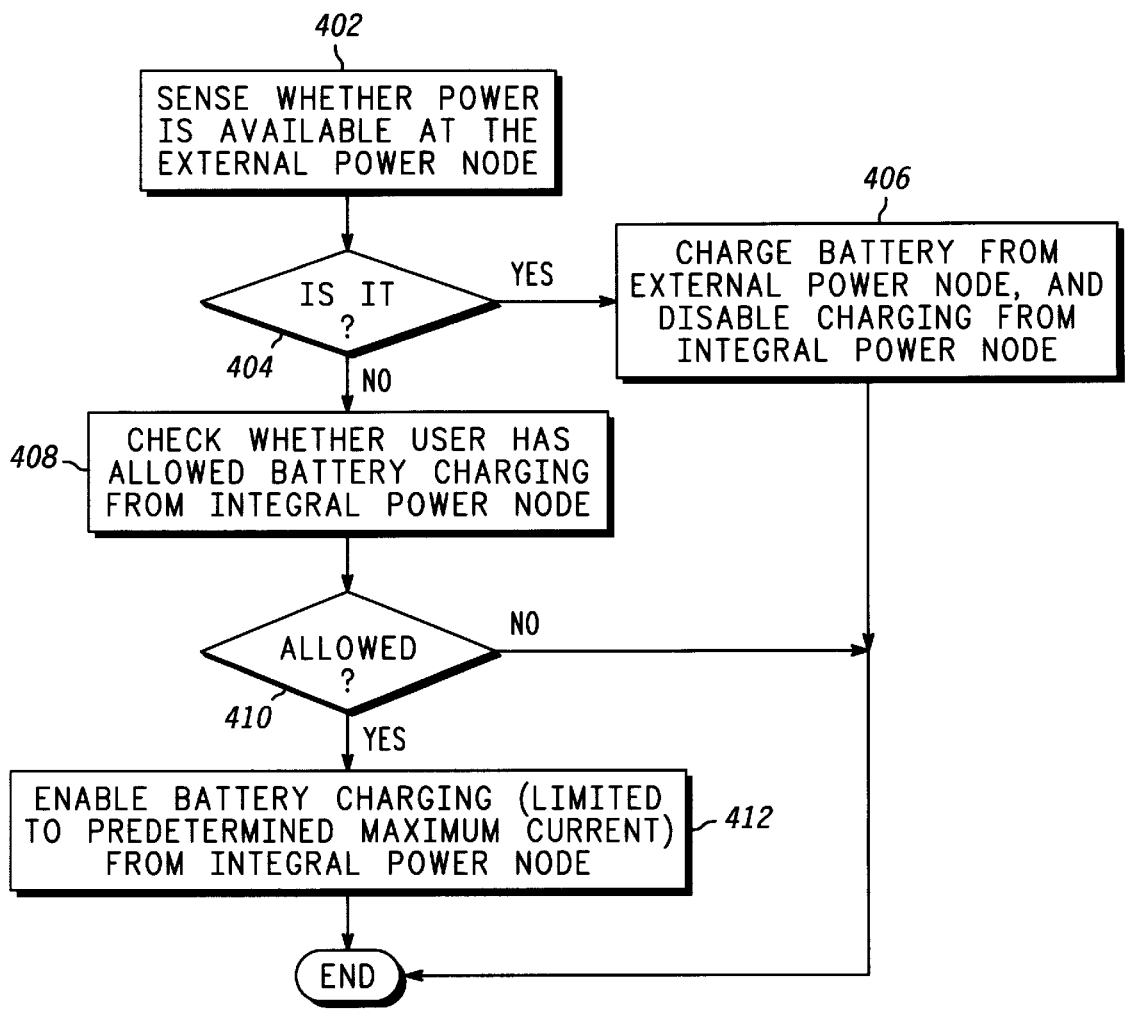
FIG. 4 is a flow chart depicting the operation of the battery charging apparatus in accordance with the present invention.

FIG. 4 is a flow chart 400 depicting the operation of the battery charging apparatus in accordance with the present invention. First, the processing system 228 senses 402, through well-known level detection techniques, whether power is present at the external power node 220. If so, from step 404 the processing system 228 cooperates with the charging switcher 216 to charge 406 the battery 210 from the external power node 220 and to disable battery charging from the integral power node 218. If not, from step 404 the processing system 228 checks 408 the allowability variable 312 to determine whether the user has programmed the device 300 to allow battery charging from the integral power node 218. If at step 410 charging is allowed from the integral power node, the processing system 228 cooperates with the charging switcher 216 to enable 412 battery charging from the integral power node, after which the process ends. If, on the other hand at step 410 charging is not allowed from the integral power node 218, the process simply ends.

It should be clear from the preceding disclosure that the present invention provides an alternative method and apparatus for recharging a battery. Advantageously, the alternative method and apparatus does not require an AC power outlet or a battery charger, but utilizes power from another device to which the portable communication device can be coupled through a standard data bus.

Many modifications and variations of the present invention are possible in light of the above teachings. Thus, it is to be understood that, within the scope of the appended claims, the invention can be practiced other than as specifically described herein above.

What is claimed is:

1. A method for charging a battery in a portable communication device having an external connector that includes an external power node and a data bus having an integral power node, the method comprising the steps of:

sensing whether power is available at the external power node;

charging the battery from the external power node whenever power is available at the external power node; and enabling battery charging from the integral power node when power is not available at the external power node.

2. The method of claim 1, further comprising the step of disabling battery charging from the integral power node when power is available at the external power node.

3. The method of claim 1, further comprising the step of providing a command for permitting a user to allow and disallow battery charging from the integral power node, and wherein the enabling step comprises the step of determining whether battery charging from the integral power node is allowed before charging the battery from the integral power node.

4. The method of claim 1, wherein the data bus is a conventional Universal Serial Bus (USB).

5. The method of claim 1, further comprising the step of powering circuits of the portable communication device from the integral power node when power is not available at the external power node and power is available at the integral power node.

6. An apparatus for charging a battery in a portable communication device having an eternal connector that includes an external power node and a data bus having an integral power node, the apparatus comprising:
 a sensor for sensing whether power is available at the external power node;
 charging circuitry coupled to the sensor for charging the battery from the external power node whenever power is available at the external power node; and
 enabling circuitry coupled to the sensor for enabling battery charging from the integral power node when power is not available at the external power node.

7. The apparatus of claim 6, further comprising disabling circuitry coupled to the sensor for disabling battery charging from the integral power node when power is available at the external power node.

8. The apparatus of claim 6, further comprising user controls for providing a command for permitting a user to allow and disallow battery charging from the integral power node, and wherein the enabling circuitry comprises a determining element for determining whether battery charging from the integral power node is allowed before charging the battery from the integral power node.

9. The apparatus of claim 6, wherein the data bus is a conventional Universal Serial Bus (USB).

10. The apparatus of claim 6, further comprising powering circuitry coupled to the sensor for powering circuits of the portable communication device from the integral power node when power is not available at the external power node and power is available at the integral power node.

11. A portable communication device, comprising:
 a receiver for receiving a message;
 a processing system coupled to the receiver for processing the message;
 an external connector including:
  an external power node; and
  a data bus having an integral power node; and
 an apparatus for charging a battery, the apparatus comprising:
  a sensor for sensing whether power is available at the external power node;
  charging circuitry coupled to the sensor for charging the battery from the external power node whenever power is available at the external power node; and
  enabling circuitry coupled to the sensor for enabling battery charging from the integral power node when power is not available at the external power node.

12. The portable communication device of claim 11, further comprising disabling circuitry coupled to the sensor for disabling battery charging from the integral power node when power is available at the external power node.

13. The portable communication device of claim 11, further comprising user controls for providing a command for permitting a user to allow and disallow battery charging from the integral power node, and wherein the enabling circuitry comprises a determining element for determining whether battery charging from the integral power node is allowed before charging the battery from the integral power node.

14. The portable communication device of claim 11, wherein the data bus is a conventional Universal Serial Bus (USB).

15. The portable communication device of claim 11, further comprising powering circuitry coupled to the sensor for powering circuits of the portable communication device from the integral power node when power is not available at the external power node and power is available at the integral power node.

* * * * *